(12) United States Patent
Zhou et al.

(10) Patent No.: US 10,948,672 B2
(45) Date of Patent: Mar. 16, 2021

(54) MATERIAL FOR BLOCKING CROSSTALK, OPTICAL ASSEMBLY, AND METHOD FOR PREPARING MATERIAL

(71) Applicant: Huawei Technologies Co., Ltd., Guangdong (CN)

(72) Inventors: Min Zhou, Shenzhen (CN); Ning Cheng, Bridgewater, NJ (US); Zhenxing Liao, Wuhan (CN); Huafeng Lin, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 1034 days.

(21) Appl. No.: 15/462,492

(22) Filed: Mar. 17, 2017

(65) Prior Publication Data
US 2017/0192186 A1    Jul. 6, 2017

Related U.S. Application Data

(63) Continuation of application No. PCT/CN2014/086865, filed on Sep. 18, 2014.

(51) Int. Cl.
*G02B 6/42* (2006.01)
*G02B 5/20* (2006.01)
*H04B 10/40* (2013.01)

(52) U.S. Cl.
CPC .............. *G02B 6/4283* (2013.01); *G02B 5/20* (2013.01); *G02B 5/204* (2013.01); *G02B 6/4215* (2013.01); *G02B 6/4246* (2013.01); *G02B 6/4263* (2013.01); *G02B 6/4277* (2013.01); *H04B 10/40* (2013.01)

(58) Field of Classification Search
CPC ........ G02B 6/4283; G02B 5/204; G02B 5/20; G02B 6/4277; G02B 6/4263; G02B 6/4246; G02B 6/4215; H04B 10/40
USPC .......................................... 250/237 R, 237 G
See application file for complete search history.

(56) References Cited

U.S. PATENT DOCUMENTS

| | | | |
|---|---|---|---|
| 5,776,612 A | 7/1998 | Fisher | |
| 6,318,908 B1 | 11/2001 | Nakanishi et al. | |
| 7,510,338 B2 * | 3/2009 | Sakuramoto | G02B 6/4201 385/92 |
| 8,164,827 B2 * | 4/2012 | Robinson | G01J 5/02 359/356 |

(Continued)

FOREIGN PATENT DOCUMENTS

| | | |
|---|---|---|
| CN | 1540381 A | 10/2004 |
| CN | 101441290 A | 5/2009 |

(Continued)

*Primary Examiner* — Seung C Sohn
(74) *Attorney, Agent, or Firm* — Womble Bond Dickinson (Us) LLP

(57) ABSTRACT

A material for blocking crosstalk, an optical assembly, and a method for preparing the material are provided. The optical assembly includes an optical receive assembly, where a periphery of the optical receive assembly includes a transparent region and a non-transparent region; the transparent region is made of the material, where a first layer of film is located on a side opposite to an optical receiving direction, and a second layer of film is located on a side opposite to the optical receive assembly; and the non-transparent region is of an electrical-signal shielding structure.

12 Claims, 10 Drawing Sheets

(56) References Cited

U.S. PATENT DOCUMENTS

| | | | |
|---|---|---|---|
| 8,212,297 B1 * | 7/2012 | Law | H01L 27/1463 257/292 |
| 10,570,659 B2 * | 2/2020 | Haq | H01Q 17/00 |
| 2009/0126986 A1 | 5/2009 | Kim et al. | |
| 2009/0310212 A1 | 12/2009 | Shin et al. | |
| 2014/0217396 A1 | 8/2014 | Imamura et al. | |

FOREIGN PATENT DOCUMENTS

| | | |
|---|---|---|
| CN | 101604039 A | 12/2009 |
| CN | 102118194 A | 7/2011 |
| CN | 203705697 U | 7/2014 |
| EP | 2234469 A1 | 9/2010 |
| JP | 2000228555 A | 8/2000 |
| KR | 100791205 B1 | 1/2008 |
| WO | WO2008056947 A1 | 5/2008 |

* cited by examiner

MATERIAL FOR BLOCKING CROSSTALK, OPTICAL ASSEMBLY, AND METHOD FOR PREPARING MATERIAL

CROSS-REFERENCE TO RELATED APPLICATION

This application is a continuation of International Application No. PCT/CN2014/086865, filed on Sep. 18, 2014, the disclosure of which is hereby incorporated by reference in its entirety.

TECHNICAL FIELD

The present invention relates to the field of optical communications technologies, and in particular, to a material for blocking crosstalk, an optical assembly, and a method for preparing a material for blocking crosstalk.

BACKGROUND

In a passive optical network (Passive Optical Network, PON for short), a bidirectional optical sub-assembly (Bi-direction Optic Sub-Assembly, BOSA for short) is a common optical assembly. Referring to FIG. 1, FIG. 1 is a schematic structural diagram of a conventional transistor outline (Transistor Outline, TO for short) BOSA. The BOSA mainly includes an optical transmitter component (Transmitter, Tx for short), an optical receiver component (Receiver, Rx for short), a BOSA box (BOX for short) for fastening the Tx and the Tx, a wavelength division multiplexing filter (Wavelength Division Multiplexer, WDM for short), a spherical lens, and the like. The Tx and the Rx each have a cover for protecting an internal component, and a light through-hole is provided on each cover, for optical path transmission. Receiving and transmitting optical paths are converged together by using the WDM, and are coupled into the BOX through the spherical lens.

A single-TO bidirectional optical sub-assembly (Single-TO BOSA) is a technical solution that features lower costs compared to a conventional double-TO BOSA. The single-TO BOSA is different from the double-TO BOSA mainly in that all internal parts of a Tx and an Rx are integrated on a base and share a cover, a WDM filter is also disposed inside the cover, and a spherical lens is disposed inside the cover or on the cover. For the single-TO bidirectional optical sub-assembly, because the internal parts of both the Tx and the Rx are located in one cover, a laser diode (Laser Diode, LD for short) and a modulation circuit inside the Tx causes problems such as optical crosstalk and electrical crosstalk to a photonic diode (Photonic Diode, PD for short) inside the Rx.

To address this problem, currently, a solution is already provided by using a single-TO bidirectional optical sub-assembly. In terms of electrical crosstalk resistance, a metal completely-enclosed structure is used to enclose the PD outside, to resist electromagnetic crosstalk, and only a light through-hole is provided to receive inlet light. In addition, gold wires of the LD and the PD are laid out in reverse directions, to avoid electrical signal interference. In terms of optical crosstalk resistance, the metal completely-enclosed structure can keep out most scattering light of the LD. As for a small amount of scattering light transmitted through the light through-hole, a skewed slot is excavated on the base, and the PD is designed to be disposed on the skewed slot. An inclined surface of the skewed slot is in a direction reverse to a transmission direction of the LD, so that an angle exists between a light sensitive surface of the PD and scattering light of the LD, thereby reducing optical crosstalk.

However, in the foregoing technology, a light through-hole is provided on the metal completely-enclosed structure; therefore, electrical crosstalk still exists, resulting in deteriorated receiving sensitivity. In addition, in the PD with a reverse skewed slot, although scattering light crosstalk from the LD is reduced, an effective light sensitive surface for receiving light is also reduced, resulting in reduced receive power.

SUMMARY in view of this, embodiments of the present invention provide a material for blocking crosstalk, an optical assembly, and a method for preparing the material, so as to resolve a technical problem of relatively low receiving sensitivity caused by electrical crosstalk or optical crosstalk in the prior art. The technical solutions are as follows:

According to a first aspect, a material for blocking crosstalk is provided, where the material includes a first layer of film, a substrate, and a second layer of film, the first layer of film and the second layer of film are respectively plated on two sides of the substrate, alternately arranged grids and grid lines are disposed on a surface of the first layer of film, the first layer of film is non-hollowed-out, and the second layer of film can transmit light with a first wavelength and reflect light with a second wavelength.

With reference to the first aspect, in a first implementation manner, the first layer of film consists of a composite transparent conductive oxide thin film TCO material, and the composite TCO material includes a TCO substrate material and non-oxide.

With reference to the first aspect, in a second implementation manner, the second layer of film includes at least two types of materials with different refractive indexes, where one type of material is oxide or sulfide or a simple substance.

With reference to the first implementation manner, in a third implementation manner, the TCO substrate material is molybdenum-doped indium oxide IMO.

With reference to the foregoing first or third implementation manner, in a fourth implementation manner, the composite TCO material is deposited on the substrate by means of spin coating or is affixed to the substrate.

With reference to any one of the foregoing first to fourth implementation manners, in a fifth implementation manner, the grids are obtained by performing optical embossing or optical lithography on the composite TCO material.

With reference to any one of the foregoing first aspect or the first to fifth implementation manners, in a sixth implementation manner, an electromagnetic transmission rate and a light transmission rate of the first layer of film are adjustable.

With reference to any one of the foregoing first to sixth implementation manners, in a seventh implementation manner, the electromagnetic transmission rate and the light transmission rate of the first layer of film meet the following formula:

$$\begin{cases} T = \dfrac{4g^2}{1+4g^2}; \\ g = \dfrac{v_0 \cos^2\left(\dfrac{n_0}{n}\right)\left[\ln\left(\sin\left(\dfrac{\pi\alpha\left(1-\dfrac{1}{\varepsilon}\right)}{\beta}\right)\right)\right]}{K\beta d\left(\dfrac{v}{v_0} - \dfrac{v_0}{v}\right)}; \\ t = \left(1 - \dfrac{2\alpha(1-\eta)}{\beta + 2\alpha\eta}\right)^2; \end{cases}$$

where

T is the electromagnetic transmission rate of the first layer of film, g is a normalized admittance of the first layer of film, $v_0$ is a resonance frequency, $n_0$ is a refractive index of an incident material, n is an equivalent refractive index of the first layer of film, α is a width of the grid lines, ε is a node constant of the composite TCO material, K is a normalization coefficient, β is a width of the grids, d is a thickness of the first layer of film, v is a frequency of an incident electromagnetic wave, t is the light transmission rate of the first layer of film, and η is a light transmittance of the first layer of film.

According to a second aspect, an optical assembly is provided, including an optical receive assembly, where a periphery of the optical receive assembly includes a transparent region and a non-transparent region; and the transparent region is made of the material according to any one of the foregoing first aspect or the first to seventh implementation manners of the foregoing first aspect, where the first layer of film is located on a side opposite to an optical receiving direction, and the second layer of film is located on a side opposite to the optical receive assembly; and the non-transparent region is of an electrical-signal shielding structure.

With reference to the second aspect, in a first implementation manner, the non-transparent region and a base of the optical assembly are integrated as one, and the optical receive assembly is embedded in the non-transparent region.

With reference to the second aspect, in a second implementation manner, the non-transparent region is of a sleeve-type electrical-signal shielding structure, and fits over the periphery of the optical receive assembly and is disposed on a base of the optical assembly.

According to a third aspect, a method for preparing a material for blocking crosstalk is provided, where the material is the material according to any one of the foregoing first aspect or the first to sixth implementation manners of the foregoing first aspect, and the method includes:

plating a second layer of film on one side of a substrate, where the second layer of film can transmit light with a first wavelength and reflect light with a second wavelength; and first attaching a composite transparent conductive oxide thin film TCO material to another side of the substrate, and then preparing grids on a surface of the composite TCO material, where the grids and grid lines are arranged alternately, to form a first layer of film that is non-hollowed-out; or first preparing grids on a surface of a composite TCO material, where the grids and grid lines are arranged alternately, to form a first layer of film that is non-hollowed-out, and then attaching the first layer of film to another side of the substrate.

With reference to the third aspect, in a first implementation manner, the attaching a composite TCO material to another side of the substrate includes:

depositing the composite TCO material on the another side of the substrate by means of spin coating.

With reference to the third aspect, in a second implementation manner, the attaching the first layer of film to another side of the substrate includes:

affixing the first layer of film to the another side of the substrate.

With reference to the third aspect or the first or second implementation manner of the third aspect, in a third implementation manner, the preparing grids on a surface of the composite TCO material includes:

preparing the grids on the surface of the composite TCO material by means of optical embossing or optical lithography.

The technical solutions provided in the embodiments of the present invention can ensure that light and electricity are completely isolated, no electromagnetic leakage exists, and a better shielding effect is achieved, thereby improving receiving sensitivity and receive power. Moreover, because no through-hole needs to be provided, a problem that an electromagnetic shielding effect and an optical path alignment difficulty are affected by a hole size is avoided. In addition, light-electricity isolation is implemented on one piece of membrane; therefore, there is a small quantity of technical items and packaging processes, costs are much lower, and a TO structure is simple. This reduces manufacturing costs, facilitates large-scale production, and improves practicability.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the embodiments of the present invention in detail with reference to the accompanying drawings.

The embodiments of the present invention mainly relate to a single-TO bidirectional optical sub-assembly, which is used to resolve a problem of insufficient receiving sensitivity. Insufficient receiving sensitivity is mainly caused by crosstalk impacts of a transmit signal on a received signal in the single-TO bidirectional optical sub-assembly. Electrical crosstalk is one of the crosstalk impacts, and optical crosstalk is another major type of crosstalk except the electrical crosstalk. For example, signals existing in an optical receive assembly of a single-TO bidirectional optical sub-assembly in an optical network unit (Optical Network Unit, ONU for short) in a gigabit-capable passive optical network (Gigabit-Capable Passive Optical Network, GPON for short) system include a 1490 nm received optical signal, a 1310 nm transmitted optical signal, a 2.5 G received electrical signal, and a 1.25 G transmitted electrical signal. The 1310 nm transmitted optical signal causes optical crosstalk to the 1490 nm received optical signal, and the 1.25 G transmitted electrical signal causes electrical crosstalk to the 2.5 G received electrical signal. Therefore, a technical measure that can shield the 1310 nm optical signal and the 1.25 G electrical signal needs to be taken for the 1490 nm optical signal and the 2.5 G electrical signal. In comparison with a conventional manner of shielding electrical crosstalk by using a metal material provided with a light through-hole and implementing optical crosstalk resistance by using a WDM with an oblique angle or by using a reverse skewed slot on a base, in the embodiments of the present invention, a material for blocking crosstalk is used as a transparent region of an optical receive assembly, to function as an electromagnetic shield layer, and an electrical-signal shielding structure is used as a non-transparent region, to function as an electromagnetic shield layer. The material for blocking crosstalk not only can shield an electrical signal, but can also transmit light with a receive optical wavelength and reflect light with a transmit optical wavelength. This ensures that light and electricity are completely isolated, no electromagnetic leakage exists, and a better shielding effect is achieved, thereby effectively improving receiving sensitivity and receive power.

Embodiment 1

Figure 1:
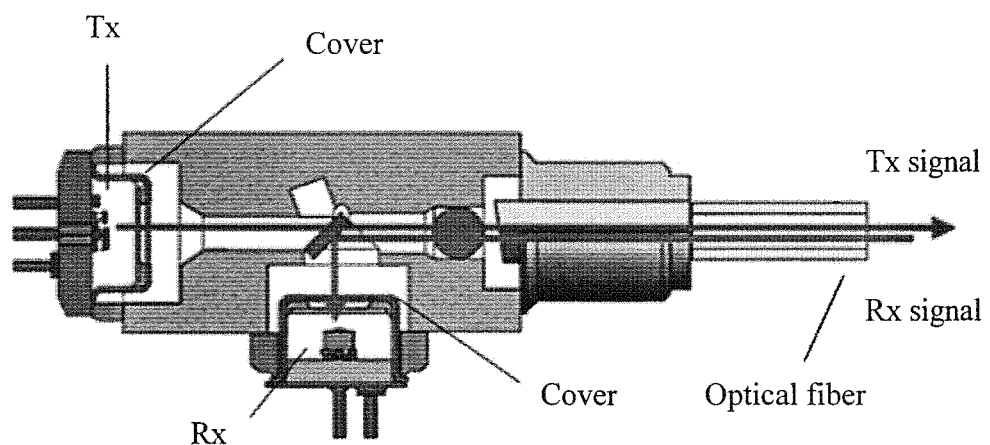
FIG. 1 is a structural diagram of a double-TO bidirectional optical sub-assembly in the prior art.
Figure 2:
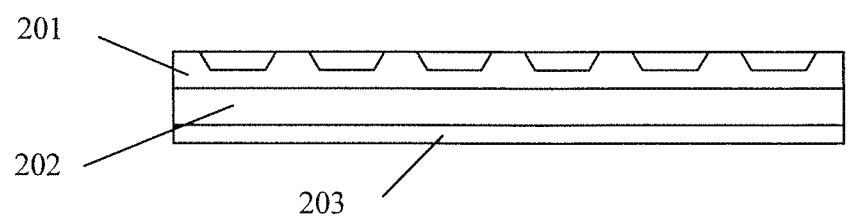
FIG. 2 is a structural diagram of a material for blocking crosstalk according to an embodiment of the present invention.

Referring to FIG. 2, an embodiment of the present invention provides a material for blocking crosstalk, where the material includes a first layer of film 201, a substrate 202, and a second layer of film 203. The first layer of film 201 and the second layer of film 203 are respectively plated on two sides of the substrate 202, alternately arranged grids and grid lines are disposed on a surface of the first layer of film 201, the first layer of film 201 is non-hollowed-out, and the second layer of film 203 can transmit light with a first wavelength and reflect light with a second wavelength.

The first layer of film 201 is used to transmit light and shield an electrical crosstalk signal, and the second layer of film 203 is used to shield an optical crosstalk signal. The second layer of film 203 may use various materials in the prior art that are used to plate a film, provided that the materials can transmit light with the first wavelength and reflect light with the second wavelength.

Specifically, the second layer of film 203 includes at least two types of materials with different refractive indexes, where any type of material may be oxide, sulfide, a simple substance, or the like. The oxide may be tantalum oxide, and the simple substance may be silicon, or the like. This is not specifically limited in this embodiment.

In addition, ideally, that the second layer of film can transmit light with the first wavelength means that the light with the first wavelength can be completely transmitted through the second layer of film. However, in actual application, the light with the first wavelength may also be partially transmitted, for example, 90% or 80% of the light with the first wavelength is transmitted through the second layer of film, so as to meet different accuracy requirements and cost requirements. No specific limitation is set herein. Ideally, that the second layer of film can reflect light with the second wavelength means that the light with the second wavelength can be completely reflected by the second layer of film without being transmitted. However, in actual application, the light with the second wavelength may also be partially reflected. For example, 90% or 80% of the light with the second wavelength is reflected, and there is still a small port of light being transmitted, but a level of optical crosstalk is extremely low, and is within an allowed range; therefore, receiving is not affected.

It should be understood that the foregoing first wavelength and second wavelength are merely examples. In actual application, the first wavelength and the second wavelength may be specified as required. When the material for blocking crosstalk is applied in different PON systems, and transmit wavelengths or receive wavelengths are different, materials and thicknesses of the second layer of film may also be different, and may be designed according to actual requirements.

Preferably, the first wavelength may be a receive optical wavelength, and the second wavelength may be a transmit optical wavelength.

The foregoing material provided in this embodiment may be used as a transparent region in an optical receive assembly of a single-TO bidirectional optical sub-assembly. This can implement that light and electricity are completely isolated, no electromagnetic leakage exists, and a good shielding effect is achieved, thereby improving receiving sensitivity and receive power. When the material is used as the transparent region in the optical receive assembly of the single-TO bidirectional optical sub-assembly, the first layer of film 201 is located on a side opposite to an optical receiving direction, and the second layer of film 203 is located on a side opposite to the optical receive assembly.

Optionally, the first layer of film may consist of a composite transparent conductive oxide thin film (Transparent Conductive Oxide, TCO for short) material, and the composite TCO material includes a TCO substrate material and non-oxide.

There may be multiple options for the TCO substrate material, for example, tin-doped indium oxide ($In_2O_3$:Sn, ITO for short), molybdenum-doped indium oxide ($In_2O_3$:Mo, IMO for short), fluorine-doped tin oxide ($SnO_2$:F, FTO for short), aluminum-doped zinc oxide (ZnO:Al, ZAO for short), and the like. Preferably, the IMO with a highest infrared transmission rate may be selected.

There are also multiple types of non-oxide, for example, zinc sulfide (ZnS), zinc selenide (ZnSe), and the like. This embodiment sets no specific limitation thereto. A cut-off wavelength of the material may be increased by doping non-oxide in the TCO substrate material.

Optionally, the composite TCO material may be deposited on the substrate by means of spin coating or be affixed to the substrate.

Optionally, the grids may be obtained by performing optical embossing or optical lithography on the composite TCO material.

The grids may be in multiple shapes, and this is not limited in this embodiment. For example, the grids may be squares, rectangles, rhombuses, hexagons, and the like. Sizes of the grids on the first layer of film may be the same, or may be different, and this is not limited herein.

Optionally, the grids may be set to be of a same size and a same shape and be arranged evenly.

In addition, a thickness of the grid lines is greater than a thickness of the grids. Therefore, the grids are of a concave structure.

Optionally, an electromagnetic transmission rate and a light transmission rate of the first layer of film are adjustable.

Optionally, the electromagnetic transmission rate and the light transmission rate of the first layer of film may meet the following formula:

$$\begin{cases} T = \dfrac{4g^2}{1+4g^2}; \\ g = \dfrac{v_0 \cos^2\left(\dfrac{n_0}{n}\right)\left[\ln\left(\sin\left(\dfrac{\pi\alpha\left(1-\dfrac{1}{\varepsilon}\right)}{\beta}\right)\right)\right]}{K\beta d\left(\dfrac{v}{v_0} - \dfrac{v_0}{v}\right)}; \\ t = \left(1 - \dfrac{2\alpha(1-\eta)}{\beta + 2\alpha\eta}\right)^2; \end{cases}$$

where

T is the electromagnetic transmission rate of the first layer of film, g is a normalized admittance of the first layer of film, $V_0$ is a resonance frequency, $n_0$ is a refractive index of an incident material, n is an equivalent refractive index of the first layer of film, α is a width of the grid lines, ε is a node constant of the composite TCO material, K is a normalization coefficient, β is a width of the grids, d is a thickness of the first layer of film, v is a frequency of an incident electromagnetic wave, t is the light transmission rate of the first layer of film, and η is a light transmittance of the first layer of film.

In this embodiment, the grids are non-hollowed-out. There is a specific thickness ratio between the grids and the grid lines, and the thickness ratio may be designed and adjustable. None of the parameters in the foregoing formula is fixed, and the parameters may be designed and adjusted as required. For example, when the electromagnetic transmission rate T of the first layer of film is already known, the width β of the grids is calculated according to T and another determined parameter, so as to design corresponding grids. For another example, when the thickness d of the grids is already known, the electromagnetic transmission rate T of the first layer of film is calculated according to d and another determined parameter, so that the electromagnetic transmission rate of the first layer of film is adjustable.

For example, to shield a 1.25 G electrical signal, a substrate material including IMO and ZnS is used, where a thickness and electromagnetic shielding efficiency of the substrate material are respectively 100 um and 35 dB, and an infrared light transmission rate is set to 95%. Then, an estimated effective grid width is 150 um, and a grid cycle is 450 um. When the grid cycle is scaled down, infrared light transmission performance is not changed, and electromagnetic shielding performance is increased.

Figure 3:
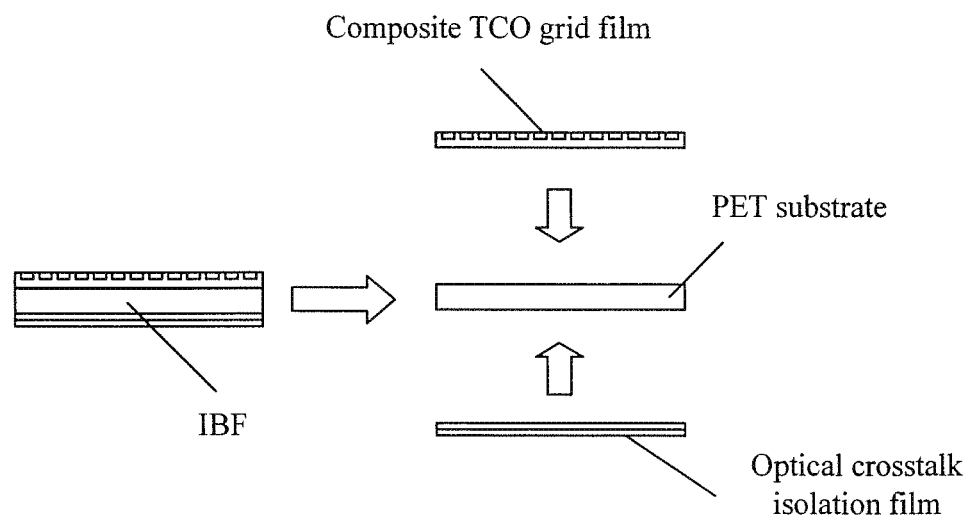
FIG. 3 is a schematic diagram of a three-layer structure of an IBF according to another embodiment of the present invention.
Figure 4:
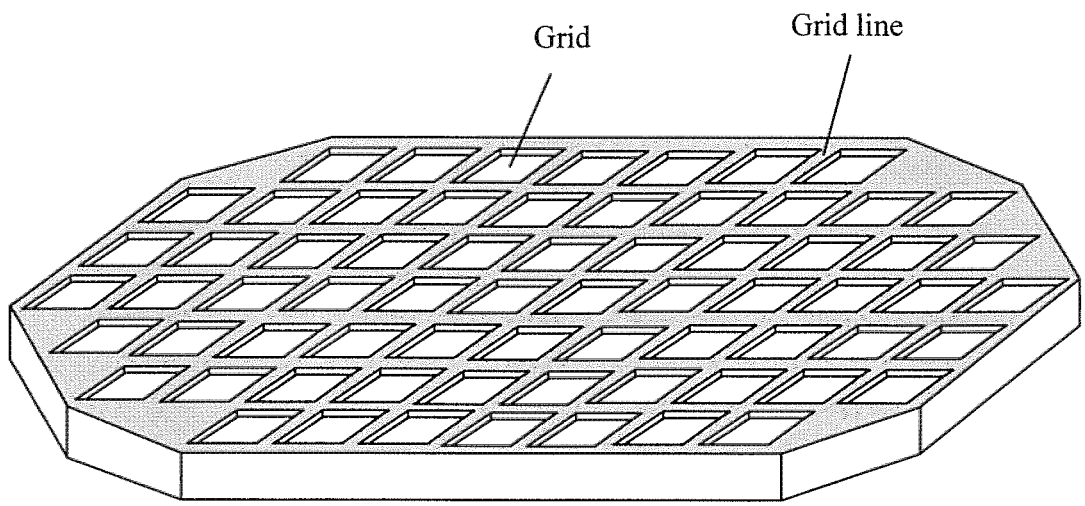
FIG. 4 is a schematic structural diagram of a grid film according to another embodiment of the present invention.

The material for blocking crosstalk provided in this embodiment may be referred to as an interference blocking film (Interference Blocking Film, IBF for short). Referring to FIG. 3, the IBF is a three-layer structure, and includes an upper layer, a middle layer, and a lower layer. The middle layer is a substrate, and is mainly used as a carrier of an upper-layer thin film material and a lower-layer thin film material. Generally, a polyethylene terephthalate (Polyethylene Terephthalate, PET for short) substrate material that is most mature and produced in a largest scale in a thin film industry may be selected, to control costs. The upper layer is a composite TCO grid film, and is mainly used to shield a received electrical signal from electrical crosstalk of a transmitted electrical signal in a TO, so that an optical signal can pass through without attenuation as far as possible. A transmission rate of the grid film is adjustable. The lower layer is an optical crosstalk isolation film, and may perform antireflection on a received optical signal, that is, transmit light, and highly reflect a transmitted optical signal, to implement optical crosstalk isolation. For a structure of the grid film, reference may be made to FIG. 4. The grid film includes grid lines and grids, where the grid lines and grids are arranged alternately, and the grid film is non-hollowed-out.

Figure 5:
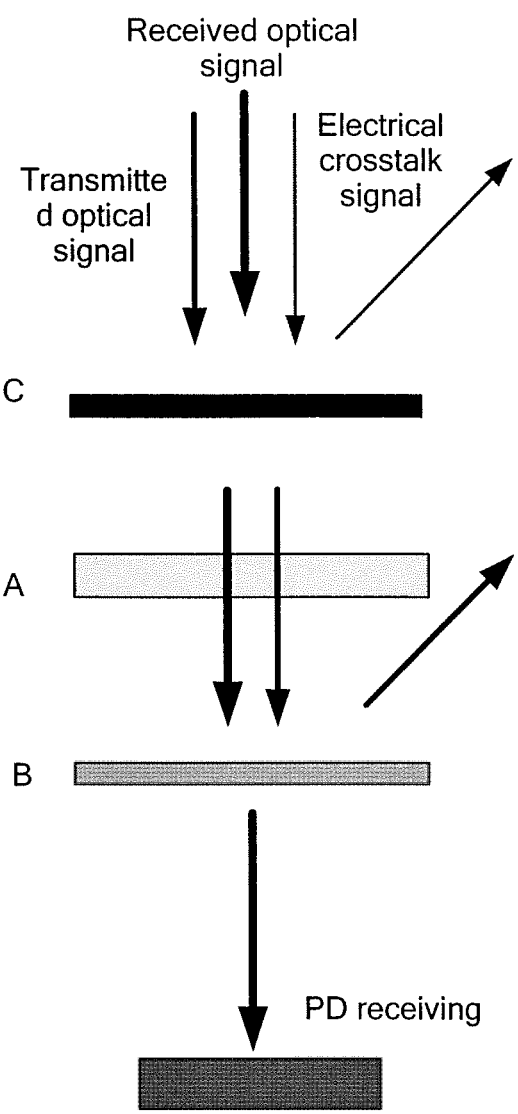
FIG. 5 is a schematic diagram of a working principle of a material for blocking crosstalk according to another embodiment of the present invention.

Referring to FIG. 5, FIG. 5 is a schematic diagram of a working principle of a material for blocking crosstalk according to another embodiment of the present invention. The material includes a substrate A, a second layer of film B, and a first layer of film C. A PD inside an optical receive assembly is used to receive an optical signal. Signals existing in the optical receive assembly include a received optical signal, a transmitted optical signal, a received electrical signal, and a transmitted electrical signal. The transmitted optical signal is an optical crosstalk signal, and the transmitted electrical signal is an electrical crosstalk signal. Both signals need to be shielded. The transmitted electrical signal is reflected when passing through the first layer of film C, so that the electrical crosstalk signal may be shielded. When the received optical signal and the transmitted optical signal enter the substrate A and reach the second layer of film B, the transmitted optical signal is isolated by the second layer of film B, so that the optical crosstalk signal may be shielded. Therefore, only the received optical signal is transmitted through the second layer of film B and is received by the PD, thereby achieving a purpose of shielding the optical crosstalk signal and the electrical crosstalk signal. This implements integrated isolation between light and electricity and improves receiving sensitivity and receive power.

By using the foregoing material provided in this embodiment, it can be ensured that light and electricity are completely isolated, no electromagnetic leakage exists, and a better shielding effect is achieved, thereby improving receiving sensitivity and receive power. Moreover, because no through-hole needs to be provided on an optical receive assembly, a problem that an electromagnetic shielding effect and an optical path alignment difficulty are affected by a hole size is avoided. In addition, light-electricity isolation is implemented on one piece of membrane; therefore, there is a small quantity of technical items and packaging processes, costs are lower, and a TO structure is simple. This reduces manufacturing costs, facilitates large-scale production, and improves practicability.

Embodiment 2

Figure 6:
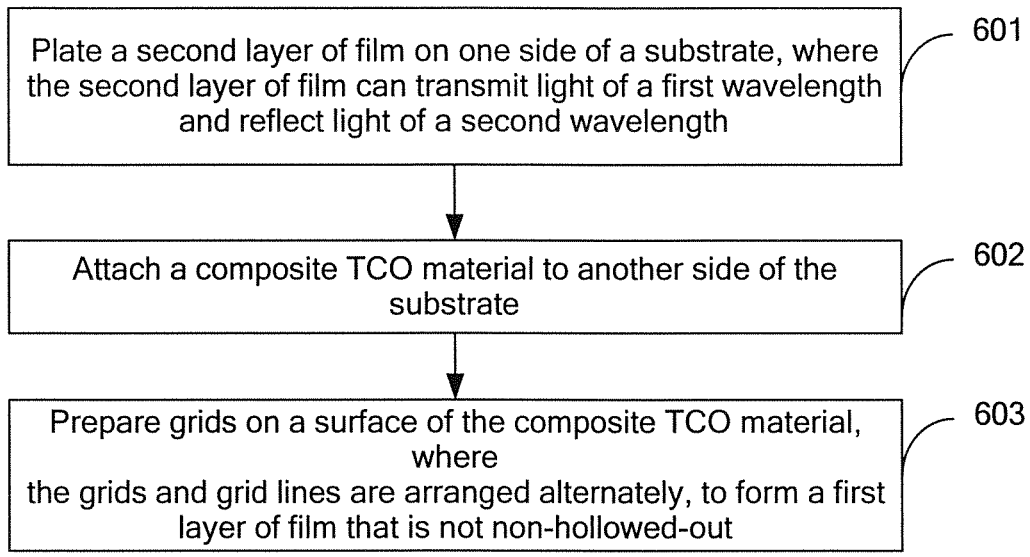
FIG. 6 is a flowchart of a method for preparing a material for blocking crosstalk according to another embodiment of the present invention.

Referring to FIG. 6, another embodiment of the present invention provides a method for preparing a material for blocking crosstalk. The method includes the following steps:

601: Plate a second layer of film on one side of a substrate, where the second layer of film includes at least two types of materials with different refractive indexes. Any type of material may be oxide, sulfide, a simple substance, or the like. The oxide may be tantalum oxide, and the simple substance may be silicon, or the like. This is not specifically limited in this embodiment.

602: Attach a composite TCO material to another side of the substrate. For details about the TCO material, refer to descriptions in Embodiment 1. Details are not described herein again.

This step may include:

depositing the composite TCO material on the another side of the substrate by means of spin coating.

603: Prepare grids on a surface of the composite TCO material, where the grids and grid lines are arranged alternately, to form a first layer of film that is non-hollowed-out.

Figure 7:
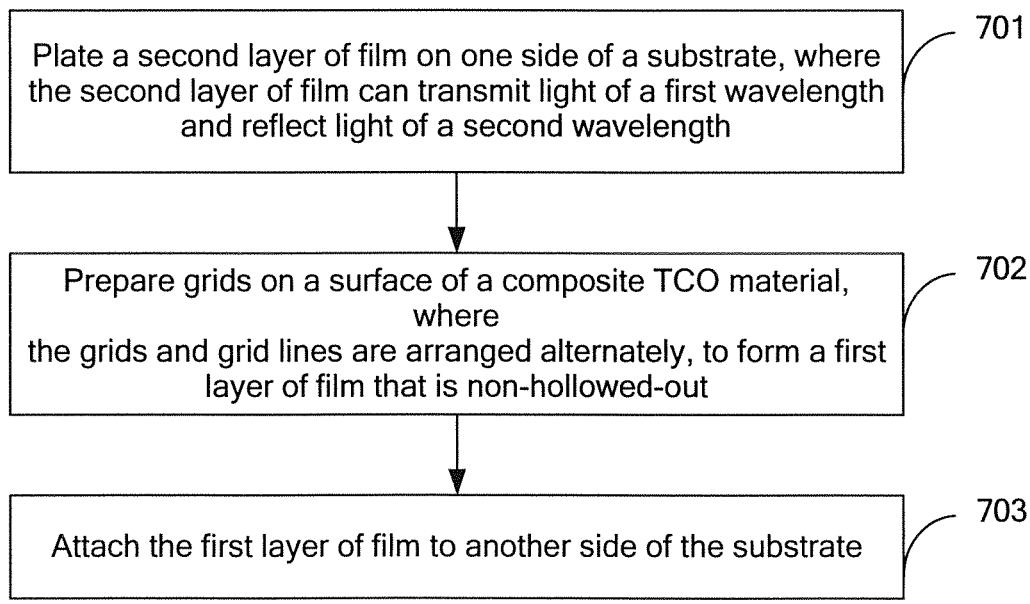
FIG. 7 is a flowchart of a method for preparing a material for blocking crosstalk according to another embodiment of the present invention.

Referring to FIG. 7, another embodiment of the present invention provides a method for preparing a material for blocking crosstalk. The method includes the following steps:

701: Plate a second layer of film on one side of a substrate, where the second layer of film includes at least two types of materials with different refractive indexes. Any type of material may be oxide, sulfide, a simple substance, or the like. The oxide may be tantalum oxide, and the simple substance may be silicon, or the like. This is not specifically limited in this embodiment.

702: Prepare grids on a surface of a composite TCO material, where the grids and grid lines are arranged alternately, to form a first layer of film that is non-hollowed-out. For details about the TCO material, refer to descriptions in Embodiment 1. Details are not described herein again.

703: Attach the first layer of film to another side of the substrate.

This step may include:

affixing the first layer of film to the another side of the substrate.

A material for blocking crosstalk may be made by using either of the foregoing methods. The material may be used as a transparent region in an optical receive assembly of a single-TO bidirectional optical sub-assembly. This can implement that light and electricity are completely isolated, no electromagnetic leakage exists, and a good shielding effect is achieved, thereby improving receiving sensitivity and receive power. When the material is used as the transparent region in the optical receive assembly of the single-TO bidirectional optical sub-assembly, the first layer of film is located on a side opposite to an optical receiving direction, and the second layer of film is located on a side opposite to the optical receive assembly.

In either of the foregoing methods, optionally, the preparing grids on a surface of the composite TCO material may include:

preparing the grids on the surface of the composite TCO material by means of optical embossing or optical lithography.

Figure 8:
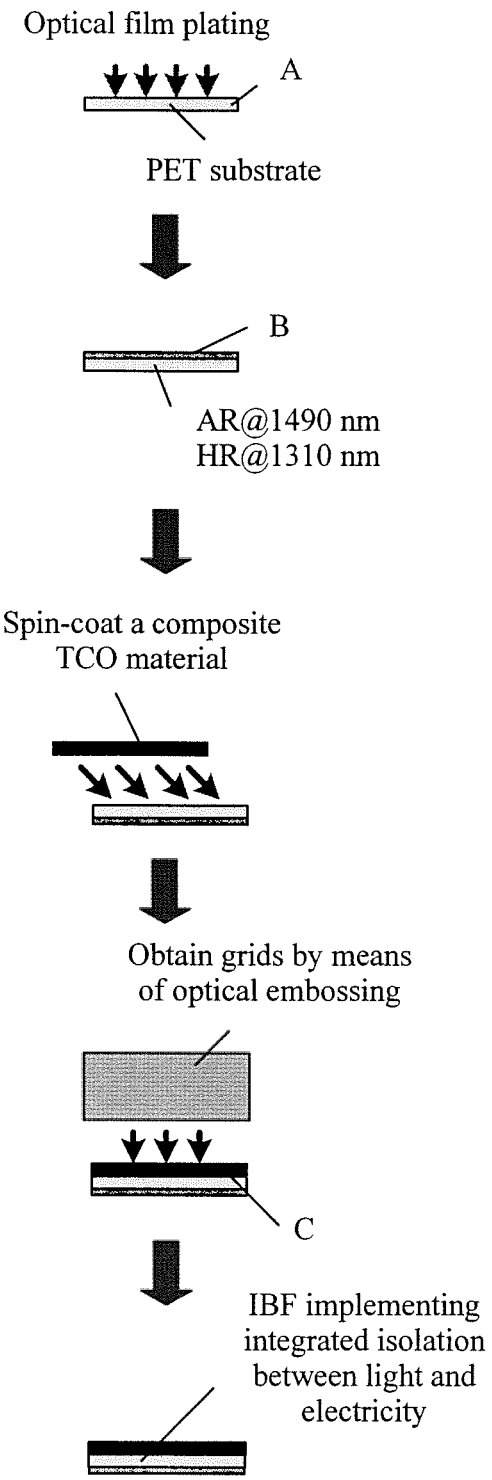
FIG. 8 is a schematic diagram of a technological process for preparing an IBF according to another embodiment of the present invention.

A material for blocking crosstalk may be made by using either of the foregoing methods. Referring to FIG. 8, FIG. 8 is a schematic diagram of a technological process for preparing the material according to another embodiment of the present invention. For example, first, optical film plating is performed on a PET substrate A, to construct an optical crosstalk isolation film B that highly transmits light with a wavelength of 1490 nm and that highly reflects light with a wavelength of 1310 nm. In this way, LD transmit light is blocked and does not interfere with a PIN receiving optical path, and received light is received without being lost. Afterward, a composite TCO material is deposited on a reverse side of the substrate A by means of spin coating, to construct an electromagnetic shield layer. Then, a grid structure is made on a surface of the composite TCO material by using an optical embossing technology, to obtain a grid film C, finally forming a material or a piece of membrane for blocking crosstalk, where the material or membrane includes C, A, and B.

It should be understood that, in the foregoing example, the wavelengths of 1490 nm and 1310 nm are merely examples for illustration. In actual application, Structure parameters may be designed for different wavelengths, to optimize electromagnetic shielding effectiveness and light transmission performance of a thin film, so as to adapt to application in a product. For grids at a hundred-micron scale, an optical embossing technology is already sufficient, and optical lithography is not needed. Therefore, in the present invention, an extremely low requirement is posed on embossing precision, and costs of molds are extremely low.

A material for blocking crosstalk made by using either of the foregoing methods provided in the embodiments may be used as a transparent region in an optical receive assembly of a single-TO bidirectional optical sub-assembly. This can implement that light and electricity are completely isolated, no electromagnetic leakage exists, and a good shielding effect is achieved, thereby improving receiving sensitivity and receive power. Moreover, because no through-hole needs to be provided, a problem that an electromagnetic shielding effect and an optical path alignment difficulty are affected by a hole size is avoided. In addition, light-electricity isolation is implemented on one piece of membrane; therefore, there is a small quantity of technical items and packaging processes, costs are much lower, and a TO structure is simple. This reduces manufacturing costs, facilitates large-scale production, and improves practicability.

Embodiment 3

Figure 9:
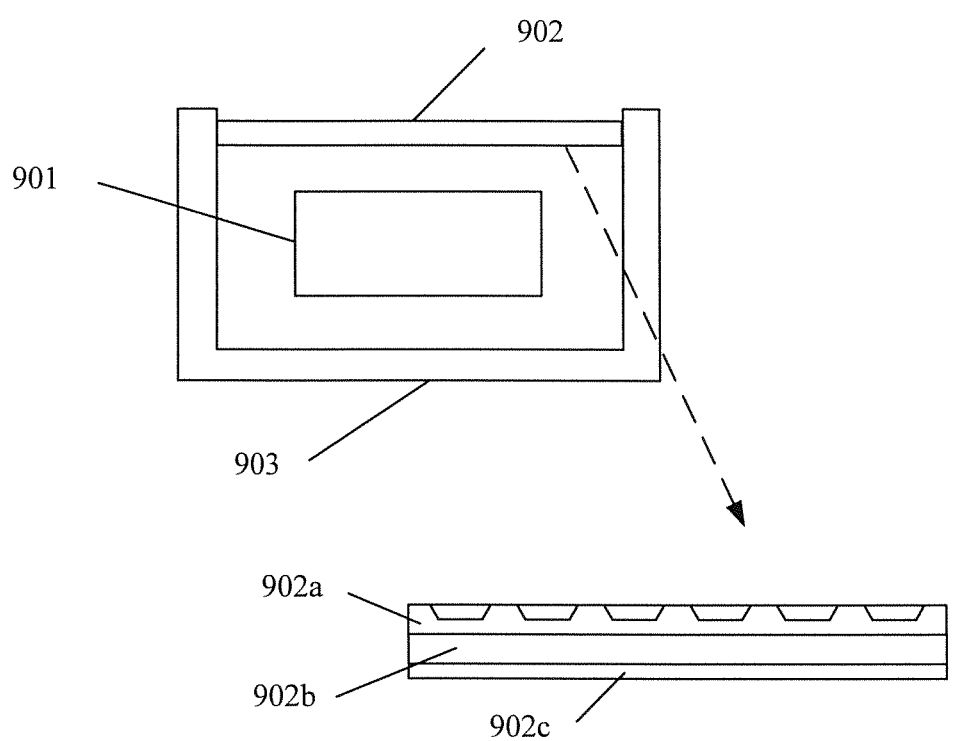
FIG. 9 is a structural diagram of an optical assembly according to another embodiment of the present invention.

Referring to FIG. 9, an embodiment of the present invention provides an optical assembly, including an optical receive assembly 901.

A periphery of the optical receive assembly 901 includes a transparent region 902 and a non-transparent region 903.

The transparent region 902 is made of the material for blocking crosstalk according to Embodiment 1. The material includes a first layer of film 902a, a substrate 902b, and a second layer of film 902c. The first layer of film 902a located on a side opposite to an optical receiving direction, and the second layer of film 902c is located on a side opposite to the optical receive assembly. The non-transparent region 903 is of an electrical-signal shielding structure.

For a structure of the material for blocking crosstalk, refer to descriptions in Embodiment 1. Details are not described herein again. For ease of description, the material for blocking crosstalk may be referred to as an IBF.

The second layer of film 902c can transmit light with a first wavelength and reflect light with a second wavelength. Preferably, the first wavelength is a receive optical wavelength, and the second wavelength is a transmit optical wavelength. There may multiple combinations of the receive optical wavelength and the transmit optical wavelength, which are not limited herein. For example, the combination may be as follows: the transmit optical wavelength is 1310 nm and the receive optical wavelength is 1550 nm, or the transmit optical wavelength is 850 nm and the receive optical wavelength is 1310 nm, or the transmit optical wavelength is 1310 nm and the receive optical wavelength is 1490 nm, or the like. For different combinations, a parameter of the film is changed, to meet actual application need.

Preferably, the non-transparent region and the IBF may be seamlessly connected (for example, completely adjoined), to implement full enclosure.

The non-transparent region may be any material that can shield an electrical signal. Specifically, the non-transparent region may use a metal component, which includes but is not limited to: a metal shell, a metal base, a metal block, a metal thin film, or the like. Alternatively, the non-transparent region may use a light-proof non-metal material, a light-proof composite material, or the like. This embodiment sets no limitation thereto.

Optionally, the foregoing non-transparent region and a base of the optical assembly may be integrated as one, and the optical receive assembly is embedded in the non-transparent region.

Optionally, the foregoing non-transparent region may be of a sleeve-type electrical-signal shielding structure, and fits over the periphery of the optical receive assembly and is disposed on a base of the optical assembly.

The optical receive assembly 901 may include a PD and a trans-impedance amplifier (Trans-Impedance Amplifier, TIA for short). The optical assembly may be specifically a single-TO bidirectional optical sub-assembly, and further includes an optical transmit assembly, a TO cover, and the like.

Figure 10:
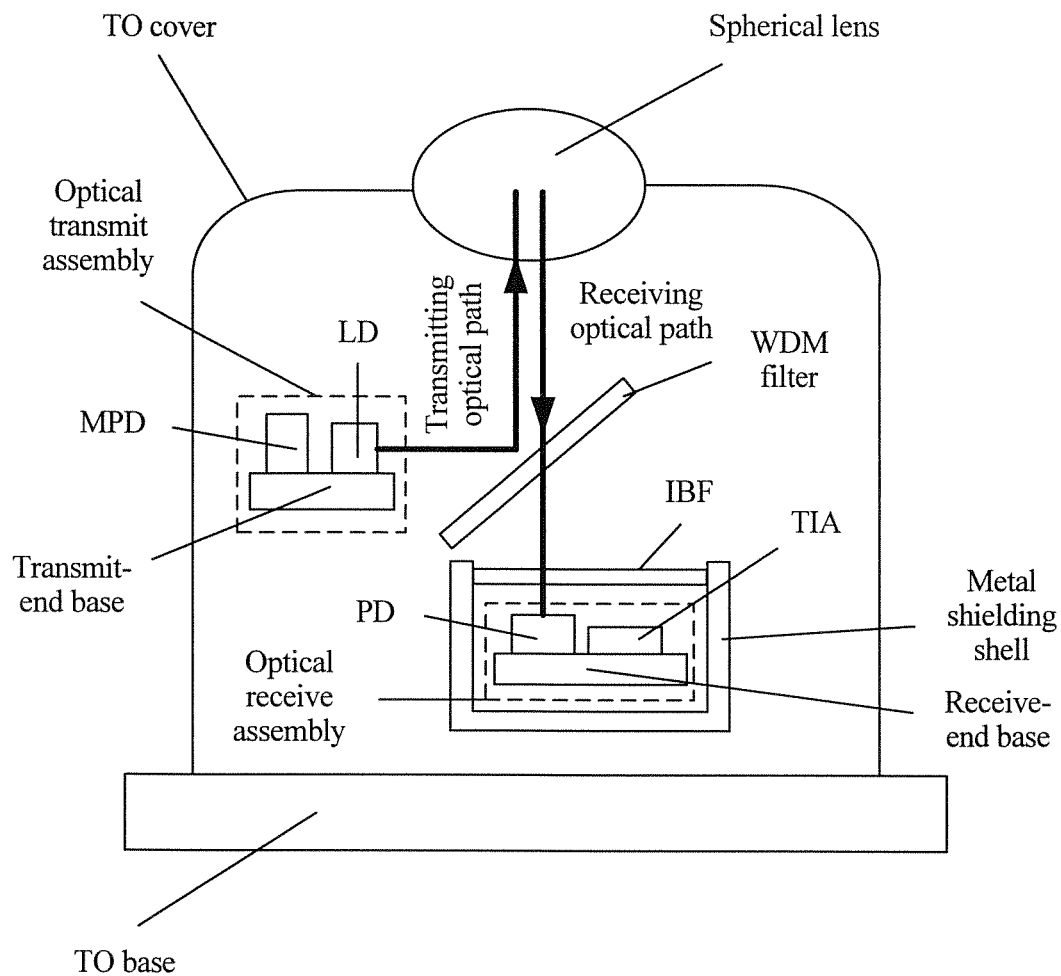
FIG. 10 is a structural diagram of a single-TO bidirectional optical sub-assembly according to another embodiment of the present invention.

Referring to FIG. 10, FIG. 10 is a schematic structural diagram of a single-TO bidirectional optical sub-assembly according to another embodiment of the present invention. The single-TO bidirectional optical sub-assembly includes a TO cover, a spherical lens, and a TO base. The TO cover is disposed on the TO base, and the spherical lens is inlaid on a top of the TO cover, so that light may be transmitted through the spherical lens. An optical transmit assembly, an optical receive assembly, and a WDM filter are laid inside the TO cover. An optical signal transmitted by the optical transmit assembly is transmitted outward through the spherical lens. An external optical signal received through the spherical lens enters the optical receive assembly after passing through the WDM filter. A transmitting optical path and a receiving optical path are converged and separated by using the WDM filter. Optical interaction between a converged optical path and the outside is performed by using the spherical lens, and the transmitting optical path and the receiving optical path are optically connected to the optical transmit assembly and the optical receive assembly respectively. The optical receive assembly includes a receive-end base, a PD, and a TIA. The PD and the TIA are disposed on the receive-end base. A periphery of the optical receive assembly includes a transparent region and a non-transparent region. The transparent region is an IBF, and may transmit light of a receive optical wavelength and reflect light of a transmit optical wavelength. The non-transparent region is a metal shielding shell, and can shield an optical signal.

By using the foregoing optical assembly provided in this embodiment, it can be ensured that light and electricity are completely isolated, no electromagnetic leakage exists, and a better shielding effect is achieved, thereby improving receiving sensitivity and receive power. Moreover, because no through-hole needs to be provided, a problem that an electromagnetic shielding effect and an optical path alignment difficulty are affected by a hole size is avoided. In addition, light-electricity isolation is implemented on one piece of membrane IBF; therefore, there is a small quantity of technical items and packaging processes, costs are much lower, and a TO structure is simple. This reduces manufacturing costs, facilitates large-scale production, and improves practicability.

Embodiment 4

Figure 11:
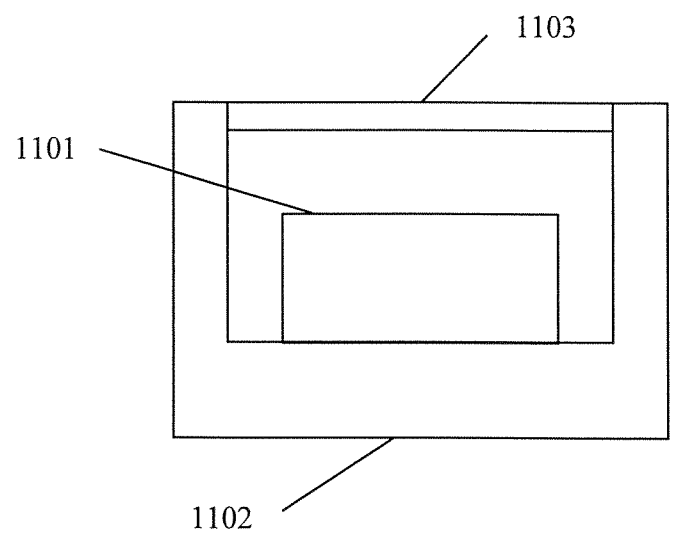
FIG. 11 is a structural diagram of an optical assembly according to another embodiment of the present invention.

Referring to FIG. 11, another embodiment of the present invention provides an optical assembly, including an optical receive assembly 1101 and a base 1102. A periphery of the optical receive assembly 1101 includes a transparent region 1103 and a non-transparent region 1102. The non-transparent region and the base are integrated as one, and the optical receive assembly 1101 is embedded in the non-transparent region 1102.

The transparent region 1103 is made of the material for blocking crosstalk according to Embodiment 1. The material includes a first layer of film, a substrate, and a second layer of film. The first layer of film is located on a side opposite to an optical receiving direction, and the second layer of film is located on a side opposite to the optical receive assembly. The non-transparent region 1102 is of an electrical-signal shielding structure.

For a structure of the material for blocking crosstalk, reference may be made to descriptions in Embodiment 1. Details are not described herein again.

Figure 12:
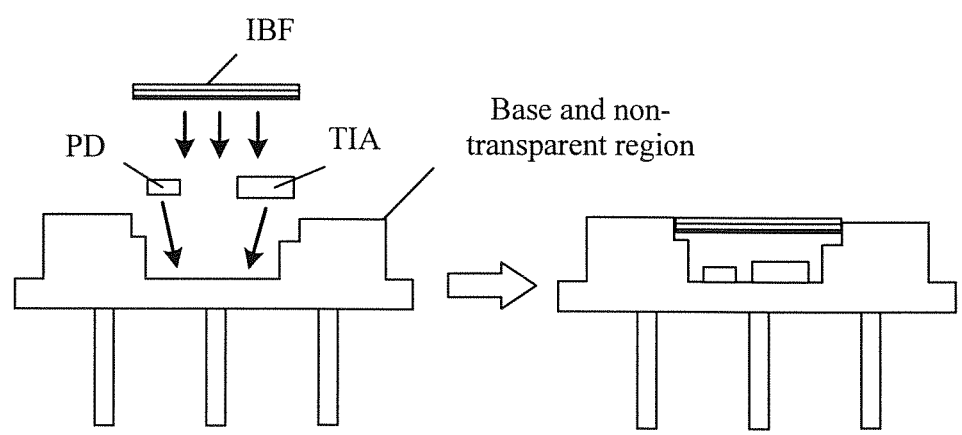
FIG. 12 is a schematic diagram of an optical assembly packaged in an embedded manner according to another embodiment of the present invention.

Referring to FIG. 12, FIG. 12 is a schematic diagram of an optical assembly packaged in an embedded manner according to another embodiment of the present invention. The optical assembly includes an optical receive assembly and a base, and the optical receive assembly includes a PD and a TIA. A periphery of the optical receive assembly includes a transparent region and a non-transparent region. The transparent region is an IBF. The non-transparent region is of an electrical-signal shielding structure, and the non-transparent region and the base are integrated as one. The PD and the TIA are packaged in the non-transparent region and the base in an embedded manner. The IBF includes a grid film that is used to transmit light and shield an electrical signal, a substrate, and an optical crosstalk isolation film that transmits light of a receive optical wavelength and reflects light of a transmit optical wavelength. Grids and grid lines are alternately arranged on the grid film. The grid film is located on a side opposite to an optical receiving direction, and the optical crosstalk isolation film is located on a side opposite to the PD and the TIA.

Figure 13:
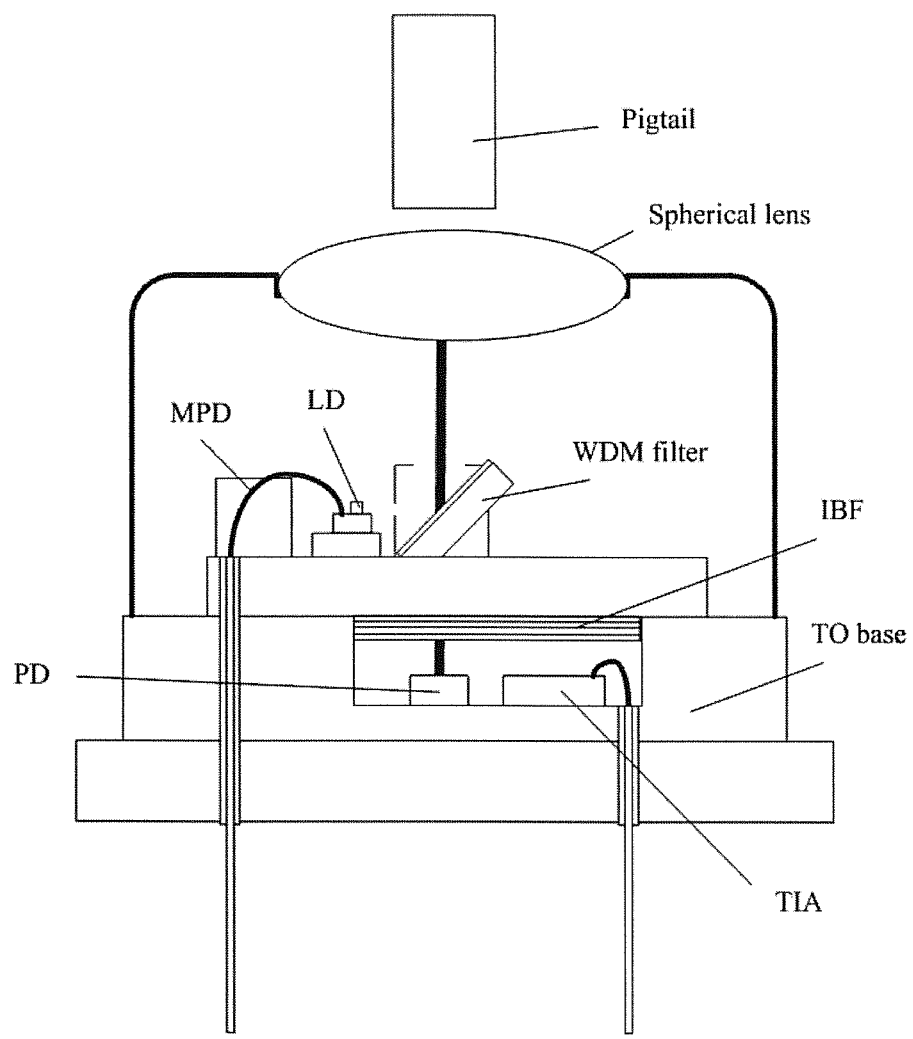
FIG. 13 is a structural diagram of a single-TO bidirectional optical sub-assembly packaged in an embedded manner according to another embodiment of the present invention.

Referring to FIG. 13, FIG. 13 is a structural diagram of a single-TO bidirectional optical sub-assembly packaged in an embedded manner according to another embodiment of the present invention. The single-TO bidirectional optical sub-assembly includes a spherical lens, an optical transmit assembly, a WDM filter, an optical receive assembly, and a TO base. The optical transmit assembly includes a monitor photonics diode (Monitor Photonics Diode, MPD for short) and a laser diode (Laser Diode, LD for short). The optical receive assembly includes a PD and a TIA. A periphery of the optical receive assembly includes a transparent region and a non-transparent region. The transparent region is an IBF. The non-transparent region is of an electrical-signal shielding structure, and the non-transparent region and the TO base are integrated as one. Specifically, this may be implemented by constructing a groove structure on the TO base. The PD and the TIA are packaged in the non-transparent region and the TO base in an embedded manner, and the IBF may be pasted on a transparent surface that receives light. The IBF includes a grid film that is used to transmit light and shield an electrical signal, a substrate, and an optical crosstalk isolation film that transmits light of a receive optical wavelength and reflects light of a transmit optical wavelength. Grids and grid lines are alternately arranged on the grid film. The grid film is located on a side opposite to an optical receiving direction, and the optical crosstalk isolation film is located on a side opposite to the PD and the TIA.

In the foregoing optical assembly provided in this embodiment, a non-transparent region and a base are integrated as one, and an optical receive assembly is embedded in the non-transparent region. This ensures that light and electricity are completely isolated, no electromagnetic leakage exists, and a better shielding effect is achieved, thereby improving receiving sensitivity and receive power. Moreover, because no through-hole needs to be provided, a problem that an electromagnetic shielding effect and an optical path alignment difficulty are affected by a hole size is avoided. In addition, light-electricity isolation is implemented on one piece of membrane IBF; therefore, there is a small quantity of technical items and packaging processes, costs are much lower, and a TO structure is simple. This reduces manufacturing costs, facilitates large-scale production, and improves practicability.

Embodiment 5

Figure 14:
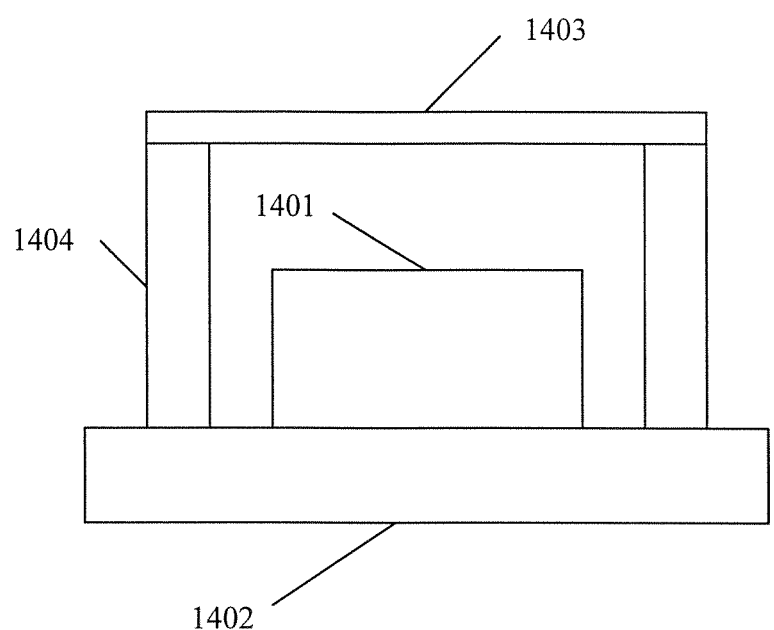
FIG. 14 is a structural diagram of an optical assembly according to another embodiment of the present invention.

Referring to FIG. 14, another embodiment of the present invention provides an optical assembly, including an optical receive assembly 1401 and a base 1402. A periphery of the optical receive assembly 1401 includes a transparent region 1403 and a non-transparent region 1404. The non-transparent region 1404 is of a sleeve-type electrical-signal shielding structure, and fits over the periphery of the optical receive assembly 1401 and is disposed on the base 1402.

The transparent region 1403 is the material for blocking crosstalk according to Embodiment 1. The material includes a first layer of film, a substrate, and a second layer of film. The first layer of film is located on a side opposite to an optical receiving direction, and the second layer of film is located on a side opposite to the optical receive assembly. The non-transparent region 1404 is of an electrical-signal shielding structure.

Figure 15:
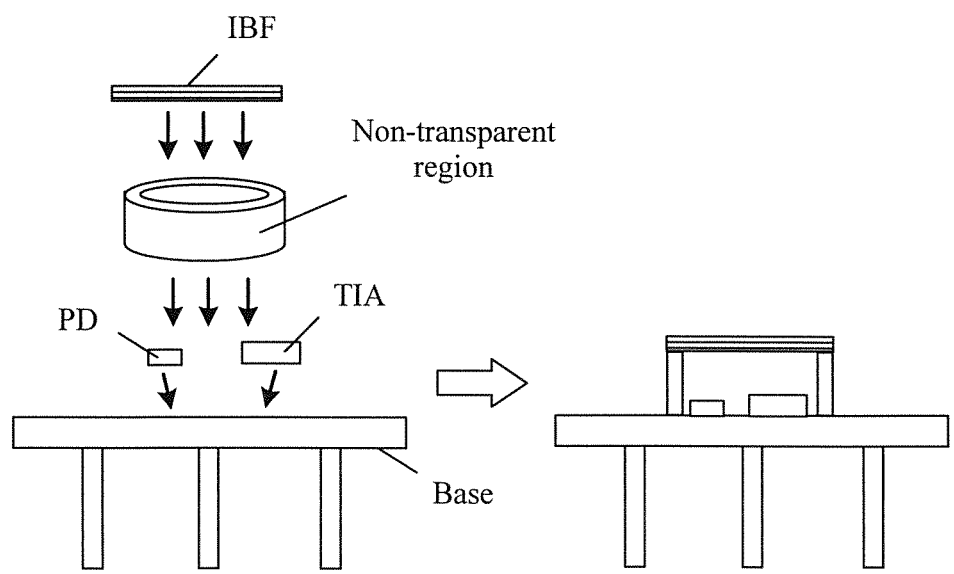
FIG. 15 is a schematic diagram of an optical assembly packaged in a sleeved manner according to another embodiment of the present invention.

Referring to FIG. 15, FIG. 15 is a schematic diagram of an optical assembly packaged in a sleeved manner according to another embodiment of the present invention. The optical assembly includes an optical receive assembly and a base, and the optical receive assembly includes a PD and a TIA, and is disposed on the base. A periphery of the optical receive assembly includes a transparent region and a non-transparent region. The transparent region is an IBF. The non-transparent region is of a sleeve-type electrical-signal shielding structure, which covers a periphery of the PD and the TIA and is disposed on the base. For example, the non-transparent region is a metal sleeve with holes provided on the top and bottom, and fits over the PD and the TIA. The IBF is pasted on a transparent surface that receives light. The IBF includes a grid film that is used to transmit light and shield an electrical signal, a substrate, and an optical crosstalk isolation film that transmits light of a receive optical wavelength and reflects light of a transmit optical wavelength. Grids and grid lines are alternately arranged on the grid film. The grid film is located on a side opposite to an optical receiving direction, and the optical crosstalk isolation film is located on a side opposite to the PD and the TIA.

In the foregoing optical assembly provided in this embodiment, a non-transparent region is of a sleeve-type electrical-signal shielding structure, which covers a periphery of an optical receive assembly and is disposed on a base. This ensures that light and electricity are completely isolated, no electromagnetic leakage exists, and a better shielding effect is achieved, thereby improving receiving sensitivity and receive power. Moreover, because no through-hole needs to be provided, a problem that an electromagnetic shielding effect and an optical path alignment difficulty are affected by a hole size is avoided. In addition, light-electricity isolation is implemented on one piece of membrane IBF; therefore, there is a small quantity of technical items and packaging processes, costs are much lower, and a TO structure is simple. This reduces manufacturing costs, facilitates large-scale production, and improves practicability.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely examples of embodiments of the present invention, but are not intended to limit the present invention. Any modification, equivalent replacement, and improvement made without departing from the spirit and principle of the present invention shall fall within the protection scope of the present invention.

What is claimed is:

1. A material for blocking crosstalk, the material comprising:
    a first layer of film;
    a nonconductive substrate; and
    a second layer of film,
    wherein the first layer of film and the second layer of film are respectively plated on two sides of the substrate, alternately arranged grids and grid lines are disposed on only an exterior surface of the first layer of film, and the first layer of film is non-hollowed-out.

2. The material according to claim 1, wherein the first layer of film comprises a composite transparent conductive oxide (TCO) thin film material comprising a TCO substrate material and a non-oxide material.

3. The material according to claim 1, wherein the second layer of film comprises at least two types of materials with different refractive indexes, wherein one of the at least two types of material comprises oxide or sulfide or a simple substance.

4. The material according to claim 2, wherein the TCO substrate material comprises molybdenum-doped indium oxide (IMO).

5. The material according to claim 2, wherein the composite TCO material is deposited on the substrate by means of spin coating or is affixed to the substrate.

6. The material according to claim 1, wherein the grids are obtained by performing optical embossing or optical lithography or photo etching on the composite TCO material.

7. The material according to claim 1, wherein an electromagnetic transmission rate and a light transmission rate of the first layer of film are adjustable.

8. The material according to claim 1, wherein an electromagnetic transmission rate and a light transmission rate of the first layer of film are determined according to the following formula:

$$\begin{cases} T = \dfrac{4g^2}{1+4g^2}; \\ g = \dfrac{v_0\cos^2\left(\dfrac{n_0}{n}\right)\left[\ln\left(\sin\left(\dfrac{\pi\alpha\left(1-\dfrac{1}{\varepsilon}\right)}{\beta}\right)\right)\right]}{K\beta d\left(\dfrac{v}{v_0}-\dfrac{v_0}{v}\right)}; \\ t = \left(1-\dfrac{2\alpha(1-\eta)}{\beta+2\alpha\eta}\right)^2; \end{cases}$$

wherein T is the electromagnetic transmission rate of the first layer of film, g is a normalized admittance of the first layer of film, $v_0$ is a resonance frequency, $n_0$ is a refractive index of an incident material, n is an equivalent refractive index of the first layer of film, α is a width of the grid lines, ε is a node constant of the composite TCO material, K is a normalization coefficient, β is a width of the grids, d is a thickness of the first layer of film, v is a frequency of an incident electromagnetic wave, t is the light transmission rate of the first layer of film, and η is an inherent light transmission rate of the TCO material.

9. A method for preparing a material for blocking crosstalk, the method comprising:
plating a second layer of film on a first side of a nonconductive substrate, wherein the second layer of film can transmit light with a first wavelength and reflect light with a second wavelength; and
attaching a composite transparent conductive oxide (TCO) thin film material to a second side of the substrate, and preparing grids on only an exterior surface of the composite TCO material, wherein the grids and grid lines are arranged alternately, to form a first layer of film that is non-hollowed-out; or
preparing grids on only an exterior surface of a composite TCO material, wherein the grids and grid lines are arranged alternately, to form a first layer of film that is non-hollowed-out, and attaching the first layer of film to a second side of the substrate.

10. The method according to claim 9, wherein attaching the composite TCO material to the second side of the substrate further comprises:
depositing the composite TCO material on the second side of the substrate by means of spin coating.

11. The method according to claim 9, wherein attaching the first layer of film to the second side of the substrate further comprises:
affixing the first layer of film to the second side of the substrate.

12. The method according to claim 9, wherein preparing the grids on the surface of the composite TCO material further comprises:
preparing the grids on the surface of the composite TCO material by optical embossing or optical lithography.

* * * * *